Aug. 4, 1953 R. L. DOWNEY 2,647,947

HIGH-FREQUENCY COUPLING DEVICE

Filed Nov. 16, 1948 2 Sheets-Sheet 1

Inventor:
Reginald L. Downey,
by Merton D. Moore
His Attorney.

Aug. 4, 1953 R. L. DOWNEY 2,647,947

HIGH-FREQUENCY COUPLING DEVICE

Filed Nov. 16, 1948 2 Sheets-Sheet 2

Inventor:
Reginald L. Downey, by Merton D. Moore
His Attorney.

Patented Aug. 4, 1953

2,647,947

UNITED STATES PATENT OFFICE 2,647,947

HIGH-FREQUENCY COUPLING DEVICE

Reginald L. Downey, Syracuse, N. Y., assignor to General Electric Company, a corporation of New York Application November 16, 1948, Serial No. 60,360

8 Claims. (Cl. 333—82)

This invention relates to high frequency coupling devices and more particularly to coupling devices utilizing transmission lines as resonant circuits.

The problem of transferring high frequency energy from a resonant transmission line to a utilization circuit is relatively simple at any one specified frequency. However, it presents a considerably more difficult problem when an efficient transfer of energy is required over a wide range of frequencies with a single structure. When a transmission line is used as a resonant circuit, it it necessary to reduce the length of the line as the frequency of operation increases. If a coupling loop is utilized as the energy transferring means, it is necessary to reduce the degree of coupling of the loop. This may be done by reducing the physical dimensions of the loop, or by altering its spatial disposition in the magnetic field of the transmission line. These principles are well known in the art and do not require any elaboration.

In the past, it has been customary to provide separately adjustable means for varying the resonant frequency of a transmission line and the degree of coupling of a utilization circuit connected thereto. This method has the disadvantage of requiring repeated adjustments of a tuning control and of a coupling control whenever, either the frequency of operation, or the degree of transfer of energy, is changed. The reason for this is that the energy coupling is greatly affected by the frequency of operation; conversely the frequency of operation is always affected to a certain extent by the coupling of a utilization circuit into the resonant circuit.

It is an object of the present invention to provide new and improved means for transferring ultra high frequency energy at a substantially constant level over a wide range of frequencies.

Another object is to provide means operating from a single control for simultaneously tuning a resonant transmission line circuit, and varying the degree of coupling of a utilization circuit operating therefrom, so as to maintain the transfer of energy at a constant level.

A further object is to provide means operating from a single control for varying the level of transfer of energy from a resonant transmission line to a utilization circuit at a predetermined rate in accordance with the frequency of operation.

Four additional objects and advantages and for a better understanding of the invention, attention is now directed to the following description and accompanying drawings, and also to the appended claims in which the features of the invention believed to be novel are particularly pointed out.

Figure 1:
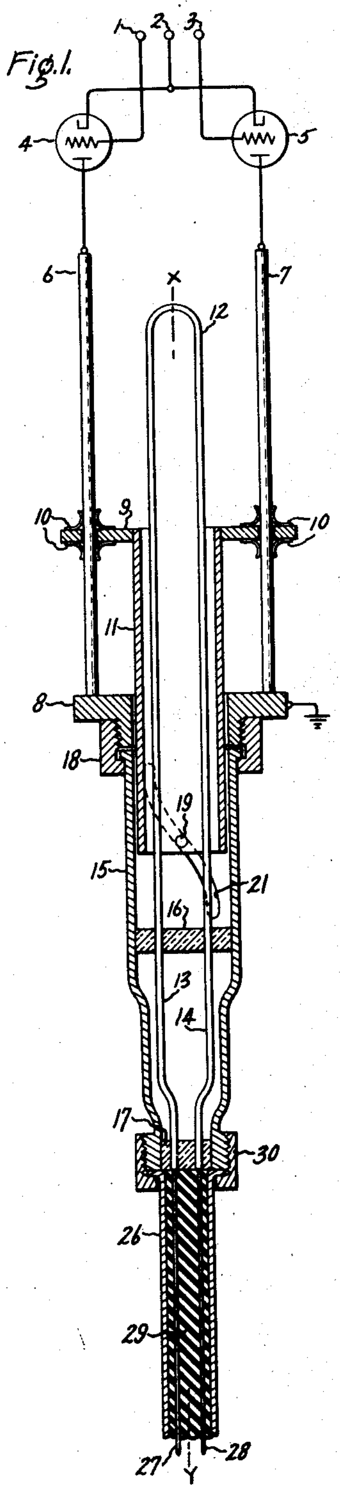
Figure 2:
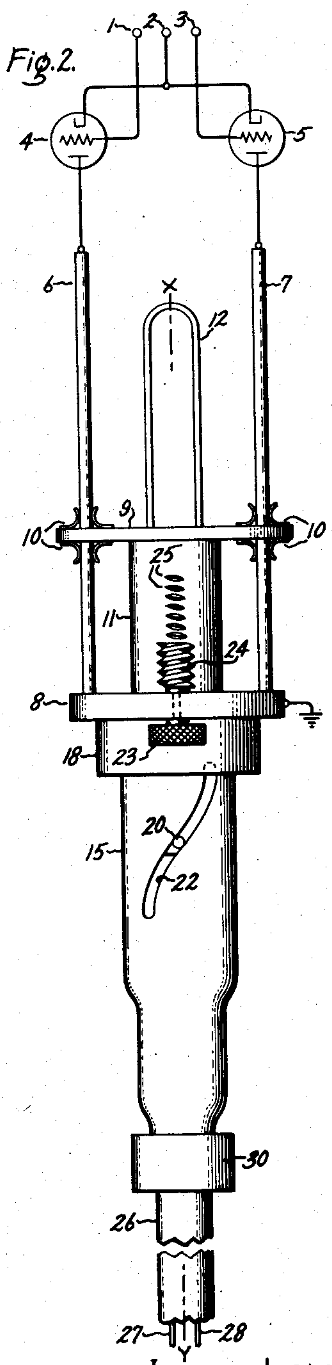
Figure 3:
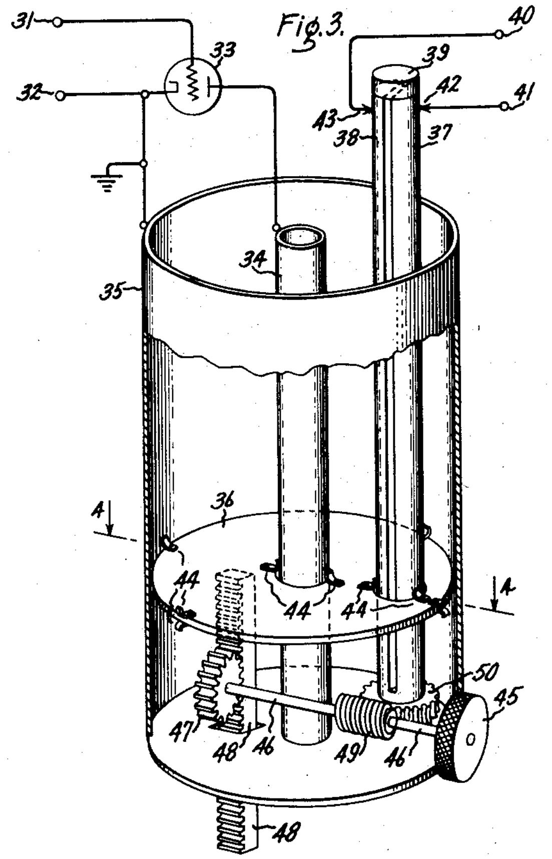
Figure 4:
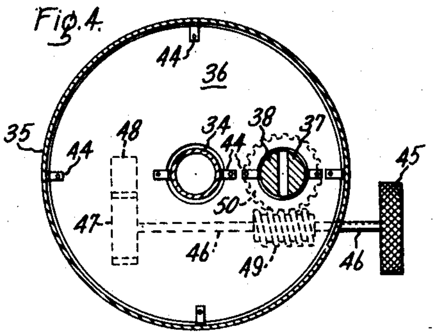

In the drawings, Fig. 1 is a cross-sectional view in vertical elevation of an open-wire transmission line coupling device embodying my invention; Fig. 2 is a vertical elevation view of the same embodiment as that of Fig. 1; Fig. 3 is a perspective view of a concentric line coupling device embodying my invention; and Fig. 4 is a plan view through the device of Fig. 3 at section 4—4.

Referring to Figs. 1 and 2, terminals 1, 2, and 3 represent the input circuit to a pair of valves 4 and 5 which are connected in push-pull. The anodes of these valves are connected respectively to a pair of straight rod-like conductors 6 and 7, which are arranged parallel to each other to form a tunable transmission line. The lower ends of the conductors are fastened to a supporting member 8. A short-circuiting bar 9 is disposed to slide along the conductors 6 and 7, maintaining contact thereto by a plurality of spring fingers 10. The short-circuiting bar has a circular opening cut therein into which the upper end of a conducting cylinder 11 is fitted. The cylinder 11 can slide along with the bar and projects through a circular opening in the member 8.

A coupling loop 12, constituted by the continuation of a pair of inner conductors 13 and 14 rendering the loop balanced with respect to ground, is symmetrically disposed between the conductors 6 and 7. The coupling loop is fixed to a tubular sheath 15 by a pair of insulators 16 and 17. The upper end of the sheath 15 is held in contact with the supporting member 8 by means of a flanged nut 18, which engages an annular projection at the upper end of the sheath. The nut 18 is tightened sufficiently to prevent displacement of the sheath in a vertical direction, but enough play is maintained to allow rotation of the sheath about the vertical axis XY.

The cylinder 11 and the sheath 15 are mechanically linked so that axial displacement of the former causes angular displacement of the latter. This is brought about by means of a pair of pins 19 and 20 which are affixed to diametrically opposite points on the outside surface of the cylinder 11 at its lower end. The pins engage a pair of slots 21 and 22 cut into the sheath 15 so as to define a helical surface. The pins can move vertically along with the cylinder 11 and the bar 9, but cannot rotate about the axis XY. On the other hand, the sheath 15 is prevented from undergoing any axial displacement by the member 8 and the flanged nut 18, but is allowed to rotate about the axis XY. Accordingly, the sheath 15 rotates at a rate, with respect to the axial displacement of the shorting bar, dependent upon the shape of the slots cut into its surface.

Referring to Fig. 2, the axial displacement of the bar is conveniently achieved by means of a knurled knob 23 fastened to a shaft projecting through the supporting member 8 and carrying at its opposite end a worm 24. The worm engages with a series of indentures 25 cut into the surface of the cylinder 11 so as to constitute a rack.

The rotation of the sheath 15 carries with it the coupling loop 12 and also a connecting cable 26. The connecting cable is of a suitable flexible construction and comprises a pair of inner conductors 27 and 28, and a solid dielectric 29. The flexible cable is securely fastened to the sheath 15 by means of a flanged nut 30, which locates it in such a manner that the inner conductors 27 and 28 make contact with the conductors 13 and 14 whose upward projection constitutes the coupling loop 12. It is desirable, but not essential, that the dimensions of the coupling loop 12 and of the cylinder 11 be such as to yield a characteristic impedance equal to that of the cable 26. When this is done, losses in the coupling circuit due to undesired reflections are minimized.

During the tuning operation, the knurled knob 23 is rotated in a direction to move the short-circuiting bar upwards if the frequency of operation is to be increased, or conversely, downwards if the frequency of operation is to be decreased. Due to the shielding effect of the cylinder 11 on the portion of the coupling loop 12 exposed to the magnetic field of the conductors 6 and 7, the dimensions of the coupling loop are initially varied so that the loop intercepts a desired constant fraction of a wave length at the highest frequency of operation. In addition, the loop is caused to rotate in such a manner that at the highest frequency of operation, the plane of the loop coincides with the plane of the conductors 6 and 7; whereas at the lowest frequency of operation, the plane of the loop approaches a perpendicular position with respect to the plane of the conductors. By a suitable choice of shape for the helical slots 21 and 22 in the sheath 15, the coupling loop may be made to rotate in a manner to intercept a constant fraction of a wave length at any position of short-circuiting bar 9 or to achieve any desired degree of transfer of energy with respect to the operating frequency.

This arrangement has the advantage of permitting an adjustment in frequency without requiring a simultaneous adjustment in the coupling. In addition, it is possible to provide a number of different coupling assemblies to include the sheath 15 and the coupling loop 12 mounted therein, for operation with different types of antenna. It is then a simple matter to exchange these assemblies and to insert the proper one for operation with the desired antenna.

Referring to Figs. 3 and 4, terminals 31 and 32 represent the input circuit to a valve 33, of which the anode and the cathode are connected respectively to an inner conductor 34 and outer conductor 35 of a concentric transmission line. The effective length of the concentric transmission line is adjusted by moving a short-circuiting disc 35 vertically upwards or downwards. The coupling circuit comprises a pair of semi-circular rods 37 and 38 located in the space between the inner and the outer conductors and parallel to them.

These rods project through the disc 36 and are joined together at a point below it. The spacing between the semi-circular rods is maintained fixed by means of an insulating cap 39 at their upper ends, and the energy from the coupling circuit is available at a pair of terminals 40 and 41 connected to brushes 42 and 43 making contact with rods 37 and 38, respectively. By properly proportioning the radial distance between the assembly of rods 37 and 38 and the inner conductor 34, an output, essentially balanced with respect to ground, may be maintained at terminals 40 and 41. Also the spacing between the rods 37 and 38 is preferably adjusted to yield a characteristic impedance equal to that of an output circuit to which terminals 40 and 41 are adapted to be connected.

The short-circuiting disc 36 carries a number of spring fingers 44 making contact with the outer conductor 35, the inner conductor 34 and both semi-circular rods 37 and 38. The position of the disc 36 is controlled by means of a knurled knob 45 connected to a shaft 46, driving a geared pinion 47, which engages with a rack 48 attached to the disc. The shaft 46 carries, in addition, a worm 49, which engages with a gear 50 connected to the lower end of the semi-circular rods.

The tuning and coupling adjustments are combined in this embodiment to operate in the same fashion as in the embodiment of Fig. 1. For instance the frequency is raised by rotating the knurled knob 45, which operates through pinion 47, to drive rack 48 upwards. This carries disc 36 upwards and simultaneously shortens the effective length of the coaxial line, along with the effective length of the coupling loop constituted by the semi-circular rods. The worm 49 acting on the gear 50 rotates the plane of the semi-circular rods to reduce the degree of coupling. By suitably choosing the pitch of the worm, it is possible to obtain any required characteristic in the variation of the output level with respect to the frequency of operation.

While certain specific embodiments have been shown and described, it will, of course, be understood that various modifications may be made without departing from the invention. The appended claims are, therefore, intended to cover all such modifications with the true spirit and scope of the invention.

What I claim as new and desire to secure by Letters Patent of the United States is:

1. A tuned high frequency coupling device comprising, a resonant transmission line, slidable means short-circuiting one end of said line to determine the frequency of resonance of said line, a coupling loop inductively coupled to said line for transferring energy from said line, said loop having a longitudinal axis parallel to said line and comprising a pair of parallel spaced conductors balanced with respect to a fixed reference potential, said loop being located in close proximity to said line near said one end, rotatable means for rotating said loop about its axis, thereby to vary the angular disposition of said loop with respect to said line and hence vary the degree of inductive coupling therewith, and mechanical uni-control means for interlinking, at a predetermined rate, the linear movement of said slidable means with the angular movement of said rotatable means.

2. A tuned high frequency coupling device, comprising a resonant transmission line, slidable means short-circuiting one end of said line to determine the frequency of resonance of said line, a coupling loop inductively coupled to said line in energy exchanging relation therewith, said loop having a longitudinal axis parallel to said line and comprising a pair of parallel spaced conductors balanced with respect to a fixed reference potential, means supporting said loop in close proximity to said one end of said line, and means associated with said supporting means and said slidable means for rotating said loop about its axis, thereby to vary the angular disposition of said loop with respect to said line and hence vary the degree of inductive coupling therewith, and simultaneously controlling the linear movement of said slidable means.

3. A tuned high frequency coupling device comprising, a resonant transmission line, slidable means short-circuiting one end of said line to control the frequency of resonance of said line, a coupling loop inductively coupled to said line for transferring energy from said line, said loop having a longitudinal axis parallel to said line and comprising a pair of parallel spaced conductors, said loop being located in close proximity to said one end of said line, means carried by said slidable means for concurrently varying the effective length of said conductors equally with the effective length of said line, rotatable means coupled to said slidable means for rotating said loop in response to displacement of said slidable means, thereby to vary the angular disposition of said loop with respect to said line and hence vary the degree of inductive coupling therewith, and mechanical uni-control means for interlinking, at a predetermined rate, the linear movement of said slidable means with the angular movement of said rotatable means.

4. A tuned high frequency device comprising, a resonant transmission line, slidable means shorting one end of said line to determine the frequency of resonance of said line, a coupling loop inductively coupled to said line for transferring energy from said line, said loop, comprising a pair of parallel spaced conductors having a longitudinal axis parallel to said line, being located in close proximity to said line near said one end, means carried by said slidable means for concurrently varying the effective length of said conductors equally with the effective length of said line, rotatable means for rotating said loop about its axis, thereby to vary the angular disposition of said loop with respect to said line to vary the inductive coupling therewith, and mechanical uni-control means for interlinking the angular movement of said rotatable means with the linear movement of said slidable means to maintain said transfer of energy at a constant level as the frequency of resonance of said transmission line is varied by said linear movement.

5. A tuned high frequency coupling device, comprising a resonant transmission line, slidable means shorting one end of said line to determine the frequency of resonance of said line, a coupling loop inductively coupled to said line for transferring energy from said line, said loop, comprising a pair of parallel spaced conductors having a longitudinal axis parallel to said line, being located in close proximity to said line near said one end, means carried by said slidable means for concurrently varying the effective length of said conductors equally with the effective length of said line, rotatable means cooperable with said slidable means for rotating said loop about its axis, thereby to vary the angular disposition of said loop with respect to said line thereby to vary the inductive coupling therewith, and mechanical uni-control means for effecting conjoint angular movement of said rotatable means and linear movement of said slidable means to maintain said transfer of energy at a constant level as the frequency of resonance of said transmission line is varied by said linear movement.

6. A tuned high frequency coupling device comprising, an open-wire transmission line comprising two parallel rods, mounted at their lower ends on a supporting member, said rods being spaced apart on either side of an axis of symmetry and being adapted to be energized from a source of high frequency energy at their upper ends, a short-circuiting bar carried by said rods and adapted to slide axially therealong, a coupling loop comprising a pair of spaced-apart wires joined at their upper ends and adapted to be connected at their free ends to an utilization circuit, and located symmetrically along said axis between said rods, a hollow tubular sheath attached to said bar and axially movable therewith, said sheath having a longitudinal axis corresponding with said axis of symmetry and being adapted to enclose and shield the lower end of said loop from the magnetic field between said rods below the level of said bar, means to prevent displacement of said loop along said axis of symmetry, and mechanical uni-control means to cause said loop to rotate about said axis at a predetermined rate in accordance with the axial displacement of said shorting bar and said sheath.

7. A tuned high frequency coupling device comprising, an open-wire transmission line comprising two parallel rods, mounted at their lower ends on a supporting member, said rods being spaced apart on either side of an axis of symmetry and being adapted to be energized from a source of high frequency energy at their upper ends, a short-circuiting bar carried by said rods and adapted to slide axially therealong, a coupling loop comprising a pair of spaced-apart wires joined at their upper ends and adapted to be connected at their free ends to an utilization circuit, said loop being located symmetrically along said axis between said rods, a hollow tubular sheath attached to said bar and axially movable therewith, said sheath having a longitudinal axis corresponding with said axis of symmetry and being adapted to enclose and shield the lower end of said loop from the magnetic field between said rods below the level of said bar, a hollow tube having a longitudinal axis corresponding with said axis of symmetry, said tube enclosing the lower end of said sheath; insulators in said tube to support said wires and thereby said loop, means to attach said tube to the lower side of said supporting member in a manner to permit rotation about but to prevent displacement along said axis of symmetry, and mechanical uni-control means cooperating with said sheath to cause rotation of said tube in accordance with the displacement of said short-circuiting bar and said sheath.

8. A tuned high frequency coupling device comprising, a coaxial transmission line having an inner and an outer conductor adapted to be energized from a source of high frequency energy at its upper end, a coupling loop comprising two parallel rods disposed in said line between said inner and outer conductors, a short-circuiting member adapted to travel axially in said line and to make a short-circuit from said inner to said outer conductor, and from one said rod to the other, unicontrolled means to rotate said loop and simultaneously axially to displace said short-circuiting member, and contact means engaging the upper end of said rods to couple energy from said device to an utilization circuit.

REGINALD L. DOWNEY.

References Cited in the file of this patent

UNITED STATES PATENTS

| Number | Name | Date |
|---|---|---|
| 2,311,520 | Clifford | Feb. 16, 1943 |
| 2,401,634 | Gubin | June 4, 1946 |
| 2,520,614 | Sproull | Aug. 29, 1950 |
| 2,524,532 | Linder | Oct. 3, 1950 |